United States Patent [19]
Lukinac et al.

[11] 3,756,607
[45] Sept. 4, 1973

[54] GOLF BALL HAVING IMPROVED PHYSICAL PROPERTIES

[75] Inventors: Eugene M. Lukinac; Joseph N. Massa, both of Ashland, Ohio

[73] Assignee: Globetrotter Communications, Inc., Chicago, Ill.

[22] Filed: Apr. 16, 1971

[21] Appl. No.: 134,899

[52] U.S. Cl...... 273/218, 273/DIG. 4, 273/DIG. 10, 273/DIG. 16, 260/41.5 A
[51] Int. Cl...................... A63b 37/00, C08c 11/10
[58] Field of Search................. 260/41.5 A; 273/218

[56] References Cited
UNITED STATES PATENTS

| | | | |
|---|---|---|---|
| 3,421,766 | 1/1969 | Chimiel et al.................. | 260/41.5 R |
| 3,478,132 | 11/1969 | Randolph...................... | 260/41.5 A |
| 3,502,338 | 3/1970 | Cox............................... | 260/41.5 R |
| 3,553,159 | 1/1971 | Miller et al. ................... | 260/41.5 A |

FOREIGN PATENTS OR APPLICATIONS

3,553,159  1/1971

OTHER PUBLICATIONS

Iler, "The Colloid Chemistry of Silica and Silicates", Cornell University Press, Ithaca, N.Y., 1955, pages 168 and 169.

Cabot Corporation, "Cab-o-sil", C–10, 1969, pages 2, 59 and 60.

Iler, "The Colloid Chemistry of Silica and Silicates", Cornell University Press, Ithaca, New York, 1969, pages 2, 59 and 60.

*Primary Examiner*—Allan Lieberman
*Attorney*—Oldham & Oldham

[57] ABSTRACT

This invention relates to molded golf balls formed from a composition of matter by vulcanization and which ball includes fumed silica as a reenforcing ingredient to improve the cut and/or impact resistance and to improve the initial velocity of the ball in play.

7 Claims, No Drawings

3,756,607

GOLF BALL HAVING IMPROVED PHYSICAL PROPERTIES

In general, the present invention relates to molded, unitary golf balls made from elastomeric vulcanizates by suitable molding actions, and which ball has fumed silica particles therein for improved properties in the ball.

BACKGROUND OF INVENTION

In recent years, appreciable efforts have been directed towards the provision of golf balls made from unitary molded structures rather than previous types of golf balls which normally have included a center unit, a winding around the golf ball center, and a cover layer separately applied to the golf ball center components. One United States patent in this field is Bartsch U.S. Pat. No. 3,313,545. However, it is difficult to obtain a unitary, molded golf ball of a homogeneous composition throughout and wherein the golf ball has fully desirable playing, cut resistant and use characteristics.

Reference also is made to the disclosures of and golf balls disclosed in U.S. Pat. Nos. 3,478,132 and 3,502,338. The present invention comprises an improvement in golf balls by providing them with greater cut, impact and/or shatter resistance and to improve the initial velocity thereof.

SUBJECT MATTER OF INVENTION

The present invention comprises, in general, making golf balls to include therein a high surface area reenforcing pigment, fumed silica, therein.

The general object of the present invention is to provide unitary molded golf balls formed from a homogeneous mass of a compounded elastomeric material with improved performance characteristics.

Another object of the invention is to provide new and improved molded golf balls that conform to U.S.G.A. rules on weight, size and initial impact velocity.

A specific object of the invention is to provide golf balls with fumed silica as a reenforcement therein.

The foregoing and other objects and advantages of the invention will be made more apparent as the specification proceeds.

When making golf balls today, most of such golf balls have been made from highly resilient elastomeric materials, usually synthetic rubber, or rubber-like materials of various types but particular materials suitable for such use have been highly resilient polybutadiene rubbers. These polybutadiene rubbers are available commercially from a number of suppliers. Usually the elastomers have a relatively high cis-type double bond linkage therein, and cis 1,4 polybutadiene is usually preferred in practice of the invention.

While polybutadiene elastomers are usually preferred in practice of the invention, other elastomers such as polyisoprene, ethylenepropylene copolymer, ethylene-propylene terpolymer, styrene-butadiene copolymer, or nitrile-butadiene copolymer can be substituted therefor, if desired.

It should be realized that mixtures of various elastomers may be used as the primary component of the golf ball of the invention. Of course, it is also possible to use small amounts such as between about 1 or 2 up to about 20 parts by weight of natural rubber in the composition, if desired. 100 parts of natural rubber and highly resilient rubber-like material, or synthetic elastomers, or 100 parts of an elastomer or mixtures of elastomers are present in the golf ball.

It will be realized that any desired conventional compounding ingredients may be used in making golf balls of the invention and the compositions set forth herein are those which have been found quite satisfactory in golf ball production.

The reenforcing ingredient which has been found particularly useful in practice of the invention comprises Cabot Corporation "Cab-O-Sil" the particular which is fumed silica and the particular type of such fumed silica is identified as M-5 and which has a surface area of 200 + or − 25 $m^2/gm$ (BET), a micron particle size of .012 and a density of 2.3 lbs. per cubic foot maximum. It has a pH in a 4 percent aqueous dispersion of between 3.5 − 4.2 and an ignition loss at 1,000° C. on a moisture free basis of 1 percent.

In using fumed silica as a reenforcing ingredient in the ball, it has been found that between about 15 to about 31 parts of such fumed silica provide very desirable results in that about two or more times the impact or guillotine cut resistance is provided in the novel ball in relation to balls made with conventional reenforcing pigments therein, and a slightly greater initial velocity is obtained in the ball by substitution of this fumed silica for other reenforcing pigments, such as HiSil 233, which is a precipitated silica with lower surface area particles. It also has been found that a smaller quantity of the fumed silica as described herein can be used to replace a given quantity of the precipitated silica reenforcing pigment and obtain substantially the same compression in the golf ball. It is thought that possibly the greater surface area of the fumed silica used produces a greater reenforcement action that in turn provides increased durability in the golf ball. Greater reenforcement in the molded ball holds it together to a greater degree with the polybutadiene polymer chains in the molded ball produced. This makes it harder to split or cut the ball in use or in test. Greater reenforcement is also believed to cause increased initial velocity. Such a result is obtained because greater reenforcement causes higher compression upon impact. By decreasing the percentage of silica used in relation to prior compositions to obtain compressions of the same value in the ball, the percent polybutadiene present is increased and this aids in increasing initial velocities of the balls made in accordance with the invention.

While only several test compositions are set forth herein, tests have been run on various golf balls made from different conventional compounding ingredients and wherein the amount of fumed silica present has been varied from about 15 parts to about 31 parts in relation to 100 parts of elastomer. But other quantities of the fumed silica can be used to obtain improved durability when desired. With the fumes silica of the invention included in the golf ball, it has had improved properties.

The golf ball forming composition also includes a cross-linking or vulcanizing agent in the form of a peroxide, particularly the material DiCup 40 which comprises dicumyl peroxide. This material can be used in the range of from about 0.5 to 10 parts by weight and preferably in the range of about 2 to 8 parts for best results. It comprises about 40 percent active material. DiCup R, a more active 95 percent dicumyl peroxide, may be used in the range of from about 0.5 to about 4 parts usually. Other peroxides or peroxys that may be used in practice of the invention for the dicumyl peroxide would be Bis (tertiary-butyl peroxy isopropyl)benzene, 2,4 isopropyl) benzene, dichloro-benzoyl peroxide (50 percent mix with 50 inert filler); 2,5 dimethyl -2-5-di (t-butyl-peroxy) hexane 45 percent mix with 55 percent inert filler; or 2,5 dimethyl -2,5-di (t-butyl-peroxy) hexane 3 (43 percent strength with 57 percent inert filler), or 90 perent strength with 10 percent inert filler, with the amounts being adjusted within the ranges stated depending upon the percent activity of the substance.

Other free-radical-type vulcanizing agents as, for example: persulfates, azo compounds, hydrazines, amine oxides and the like, and ionizing radiation may be used in the practice of the invention, but dicumyl peroxide is preferred.

A co-agent may be used as disclosed in Canadian Patent No. 732,500, particularly with dicumyl peroxide and other peroxides. Such coagent may be an ester type hardening resin monomer as any di-, tri-, or tetrafunctional methacrylate or acrylate.

The ester type hardening resin monomer is present in the composition used in forming balls from about 20 to 70 parts, preferably 25 to 45 parts and such material preferably comprises trimethylol propane trimethacrylate. Other polyfunctional compositions that can be satisfactorily used in some instances in substantially the same quantities and, for example, include ethylene glycol diacrylate or dimethacrylate polyethylene glycol dimethyacrylate, 1,3 butylene glycol diacrylate or dimethacrylate, pentaerythritol tetramethacrylate, pentaerythritol tetraacrylate, and similar materials.

One good method of adjusting the weight of the molded product is to vary the amount of barytes used, and about 14 to 21 parts of such filler may be present, or litarge may be substituted therefor.

An ultra high molecular weight linear polyethylene is usually present and it has a molecular weight for most of its molecules of between about 1.5 to about 2.5 million and has a melt index of 0. While this polyethylene can be used in the composition from about 2 to about 40 parts by weight, a preferred range of use of the materials is from about 10 to about 28 parts. Preferably this polyethylene is used in the composition in a very small particle size. The particles of such material can be anything from particles adapted to pass through a No. 40 screen (0.0165 inch mesh opening), which is also called U.S. standard screen size No. 235, or even finer particles which will pass through a U.S. screen size No. 400, depending upon how fine one desires to use this material in the composition and the particle size commercially available. Normally, the polyethylene has been ground to at least a size small enough so as to pass, 100 percent, through the No. 40 screen. This material is available in commercial form as AC 1221 and is produced under U.S. Pat., such as Nos. 3,072,633 and 3,050,514.

Formulations for forming the improved golf ball of the invention as as follows:

TABLE I

| Recipes (phr) | A | B | C |
|---|---|---|---|
| Ameripol CB-220 | 100 | 100 | 100 |
| SR-350 | 36.6 | 36.6 | 36.6 |
| HiSil 233 | 23.4 | | |
| Barytes | 18.5 | 18.5 | 21.0 |
| 1221 Polyethylene | 25.9 | 25.9 | 25.9 |
| Antioxidant 2246 | 0.39 | 0.39 | 0.39 |
| DiCup R | 2. | 2. | 2. |
| DOTG | 0.31 | 0.31 | 0.31 |
| A189 Silane | 1.0 | 1.0 | 1.0 |
| Cab-O-Sil M-5 | | 23.4 | 18.0 |
| | 208.1 | 208.1 | 205.2 |
| Properties of Molded Golf Balls | | | |
| Weight (grams) | 44.8 | 45.1 | 44.9 |
| Size (inches) | 1.681 | 1.681 | 1.680 |
| Compression | 59 | 76 | 62 |
| Initial Velocity (ft/sec.) | 249.7 | 250.4 | 250.6 |
| Guillotine Resistance (average drops to break) | 3 | 8 | 10 |

TABLE II

| Recipes (per hundred parts elastomer) | 266 | 267 | 268 |
|---|---|---|---|
| Diene 45NF | 54 | 54 | 54 |
| Budene 501 | 37 | 37 | 37 |
| 1-X Thin Crepe | 9 | 9 | 9 |
| SR-350 | 34.7 | 34.7 | 34.7 |
| HiSil 233 | 23 | | |
| Cab-O-Sil M-5 | | 23 | 18 |
| Barytes | 14.5 | 14.5 | 14.5 |
| TiO$_2$ | 6.2 | 6.2 | 6.2 |
| 1221 Polyethylene | 26 | 26 | 26 |
| DiCup 40C | 4.1 | 4.1 | 4.1 |
| DOTG | 0.3 | 0.3 | 0.3 |
| Antioxidant 2246 | 0.4 | 0.4 | 0.4 |
| | 205.7 | 205.7 | 200.7 |
| Properties of Molded Golf Balls | | | |
| Weight (grams) | 45.2 | 45.25 | 44.75 |
| Size (inches) | 1.677 | 1.678 | 1.679 |
| Compression | 55 | 63 | 53 |
| Initial Velocity (ft/sec.) | 244.0 | 244.4 | 244.5 |
| Guillotine Resistance (drops to break) | 20 | 35 | 29 |

From the foregoing tests, it will be seen that the balls made and tested in accordance with the data shown in Table I found that the guillotine resistance was 3 for the conventional Compound A, whereas, Compounds B and C having the improved fumed silica therein to replace the conventional hydrated silica powder had guillotine tests of an average of 8 and 10, respectively. Also, the initial velocity in feet per second was increased slightly in both of the test specimens obtained by use of Compositions B and C of Table I.

Other tests of the invention using compositions of two different elastomers plus a small quantity of natural rubber 1-X thin crepe also showed that the average guillotine resistance required in the number of drops to break or cut a ball increased from 20 with conventional Composition 266 being used, while Compositions 267 and 268 both increased the number of guillotine drops to 35 and 29, respectively, for almost a 50 percent to 100 percent increase in guillotine cut resistance. Likewise, the initial velocity was increased noticeably by the use of Compositions 267 and 268 in forming golf balls.

Diene 45 NF is a butadiene type elastomer made by The Firestone Tire & Rubber Company, while Budene 501 is a polybutadiene product of The Goodyear Tire & Rubber Company. Ameripol CB–220 is a synthetic elastomer of polybutadiene made by Goodrich-Gulf Chemicals, Inc.

The A–189 Silane shown in use in balls made in accordance with the compositions of Table I is the material gamma-mercaptopropyltrimethoxysilane available commerically today.

The Allied Chemical Co. AC–1221 polyethylene used in making some balls of the invention may have some molecules therein of a lower molecular weight than 1.5 million and some of higher weight than 2.5 million but with the polyethylene as available commercially primarily having a molecular weight of about 1.5 million.

It should be realized that other modifications and changes can be made in the compositions disclosed and that superior results will be obtained as long as the fumed silica, CAB-O-SIL M-5, or equivalent, is used in the ball as a substitute in a composition equivalent to the base composition except that the fumed silica has replaced other previously known reenforcing pigments or materials. Thus, improved impact resistance and improved velocity is obtained in molded golf balls having fumed silica present therein as a reenforcing material.

The balls produced in accordance with the invention meet all U.S.G.A. requirements and have a desirable click comparable to that of high priced separately wound and covered balls in commercial use today.

The ingredients of the golf ball are mixed in a conventional manner and usually are cured in about 16 minutes 345°345' F. Hence, golf balls can be made, compounded, mixed and cured in conventional manners and improved physical properties or characteristics will be obtained in the balls when made in accordance with the disclosure of the present invention. Thus, the objects of the invention are thought to be achieved.

While several complete embodiments of the invention have been disclosed herein, it will be appreciated that modification of these particular embodiments of the invention may be resorted to without departing from the scope of the invention.

What is claimed is:

1. A molded solid golf ball comprising a spherical unitary body made by vulcanization of the composition consisting essentially of the following ingredients in the weight ratios stated: About 100 parts of a diene elastomer, about 20–70 parts of an acrylate or methacrylate ester type polyfunctional hardening monomer, about 0.5–10 parts of a peroxide curing agent, about 14–21 parts of particulate filler material, about 2 to about 40 parts of an ultra high molecular weight polyethylene, above about 15 parts of fumed silica per 100 parts of the diene elastomer.

2. A molded golf ball as in claim 1 wherein the composition includes gamma-mercaptopropyltrimethoxysilane.

3. A molded ball as in claim 1 wherein the elastomer is a polybutadiene and the hardening monomer is trimethylol propane trimethacrylate.

4. A molded golf ball composition as in claim 1 where from about 15 to about 31 parts of fumed silica are uniformly distributed in the ball, the ball having good cut resistant properties.

5. A molded golf ball as in claim 4 where the composition included from about 1 to 20 parts of natural rubber as part of the diene elastomer.

6. A molded golf ball as in claim 1 where said polyethylene has a molecular weight of between about 1.5 and about 2.5 million.

7. A molded ball meeting U.S.G.A. requirements for a golf ball formed of a vulcanizate of a composition consisting essentially of about 100 parts by weight of a diene elastomer, about 20 to 70 parts by weight of an acrylate or methacrylate ester type polyfunctional hardening monomer, about 0.5 to 10 parts by weight of a peroxide curling agent, about 14 to 21 parts by weight of an ultra high molecular weight polyethylene and about 15 to 31 parts by weight of fumed silica, per 100 parts by weight of the elastomer.

* * * * *

UNITED STATES PATENT OFFICE
CERTIFICATE OF CORRECTION

Patent No. 3,756,607    Dated September 4, 1973

Inventor(s) Eugene M. Lukinac and Joseph N. Massa

It is certified that error appears in the above-identified patent and that said Letters Patent are hereby corrected as shown below:

Column 2, line 10, after "Cab-O-Sil" delete "the particular"

Column 3, line 3, after "2,4" delete "isopropyl) benzene,"

Column 3, line 4, before "inert" please insert -- percent --

Signed and sealed this 18th day of December 1973.

(SEAL)
Attest:

EDWARD M. FLETCHER, JR.         RENE D. TEGTMEYER
Attesting Officer               Acting Commissioner of Patents